US012710882B2

(12) United States Patent
Kim

(10) Patent No.: US 12,710,882 B2
(45) Date of Patent: Aug. 18, 2026

(54) MEMORY SYSTEM INCLUDING SYSTEM DATA AREA AND USER DATA AREA ALLOCATED BASED ON BAD BLOCK LOCATION

(71) Applicant: SK hynix Inc., Icheon-si (KR)

(72) Inventor: Se Joong Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/896,323

(22) Filed: Sep. 25, 2024

(65) Prior Publication Data

US 2025/0370630 A1 Dec. 4, 2025

(30) Foreign Application Priority Data

May 28, 2024 (KR) ........................ 10-2024-0069488

(51) Int. Cl.
*G06F 3/06* (2006.01)

(52) U.S. Cl.
CPC .......... *G06F 3/0616* (2013.01); *G06F 3/0631* (2013.01); *G06F 3/0679* (2013.01)

(58) Field of Classification Search
None
See application file for complete search history.

(56) References Cited

U.S. PATENT DOCUMENTS 10,366,761 B2 7/2019 Kim
10,528,465 B2 * 1/2020 Park ....................... G11C 29/42
11,693,568 B2 7/2023 Dedrick
2003/0065899 A1 * 4/2003 Gorobets .............. G06F 3/0613 711/E12.008
2005/0144516 A1 * 6/2005 Gonzalez ............ G06F 12/0246 714/6.13
2018/0068731 A1 * 3/2018 Kim .................... G06F 12/0238
2018/0366210 A1 * 12/2018 Park ..................... G11C 29/886
2018/0373605 A1 * 12/2018 Kim ...................... G06F 3/0679
2019/0294335 A1 * 9/2019 Kim ........................ G06F 3/061
2021/0406169 A1 12/2021 Minopoli et al.
2022/0197788 A1 * 6/2022 Park .................... G06F 13/1668
2025/0004938 A1 * 1/2025 Song ................... G06F 12/0246
2025/0165154 A1 * 5/2025 Song ....................... G06F 3/064

OTHER PUBLICATIONS

Seagate Ironwolf 510 SSD Product Manual, Rev A, Oct. 2019. First document release. Publication No. 100860537.

* cited by examiner

*Primary Examiner* — Kevin Verbrugge

(57) ABSTRACT

A memory system includes a memory device including a plurality of memory blocks constituting a plurality of super blocks in which a data entry to be stored is determined according to allocation information, and a controller configured to perform a bad block management operation when a memory block included in a first super block from among the plurality of super blocks is determined to be a bad block. For the bad block management operation, the controller is configured to change allocation information of the first super block based on a lifespan information of the first super block.

19 Claims, 11 Drawing Sheets

FIG. 1

302
304
308
P0
P1
P2
P3
P4
P5
P6
P7
Bad
Bad
Bad
Replaced
Replaced
Replaced
VSBN 0
VSBN 1
VSBN 2
VSBN 3
VSBN 4
VSBN 5
VSBN 6
VSBN 7
System Data Area
(VSBN 0 ~ 1)
User Data VSBN
(VSBN 2 ~ 6)
Reserved VSBN
(=Spare VSBN 7)

MEMORY SYSTEM INCLUDING SYSTEM DATA AREA AND USER DATA AREA ALLOCATED BASED ON BAD BLOCK LOCATION

CROSS-REFERENCE TO RELATED APPLICATION

This patent application claims the benefit of priority under 35 U.S.C. § 119(a) to Korean Patent Application No. 10-2024-0069488, filed on May 28, 2024 in the Korean Intellectual Property Office, the entire disclosure of which is incorporated herein by reference.

TECHNICAL FIELD

One or more embodiments of the present disclosure described herein relate to a memory system, and more particularly, to a memory system including a system data area and a user data area.

BACKGROUND

A memory system can include a volatile memory or a non-volatile memory. The memory system may include various components for efficiently controlling or operating the volatile memory or non-volatile memory. The memory system may undergo various tests to confirm whether to operate normally after manufacturing. In addition, the memory system may perform a debugging operation during a data input/output operation. The memory system may transmit information corresponding to an event that occurred within the memory system to an outside device. In addition to data input/output operations, the memory system may perform various operations to efficiently support data input/output operations. These operations may be performed based on system data.

BRIEF DESCRIPTION OF THE DRAWINGS

The description herein makes reference to the accompanying drawings wherein like reference numerals refer to like parts throughout the figures.

FIG. 1 illustrates a memory system according to an embodiment of the present disclosure.

DETAILED DESCRIPTION

Figure 2:
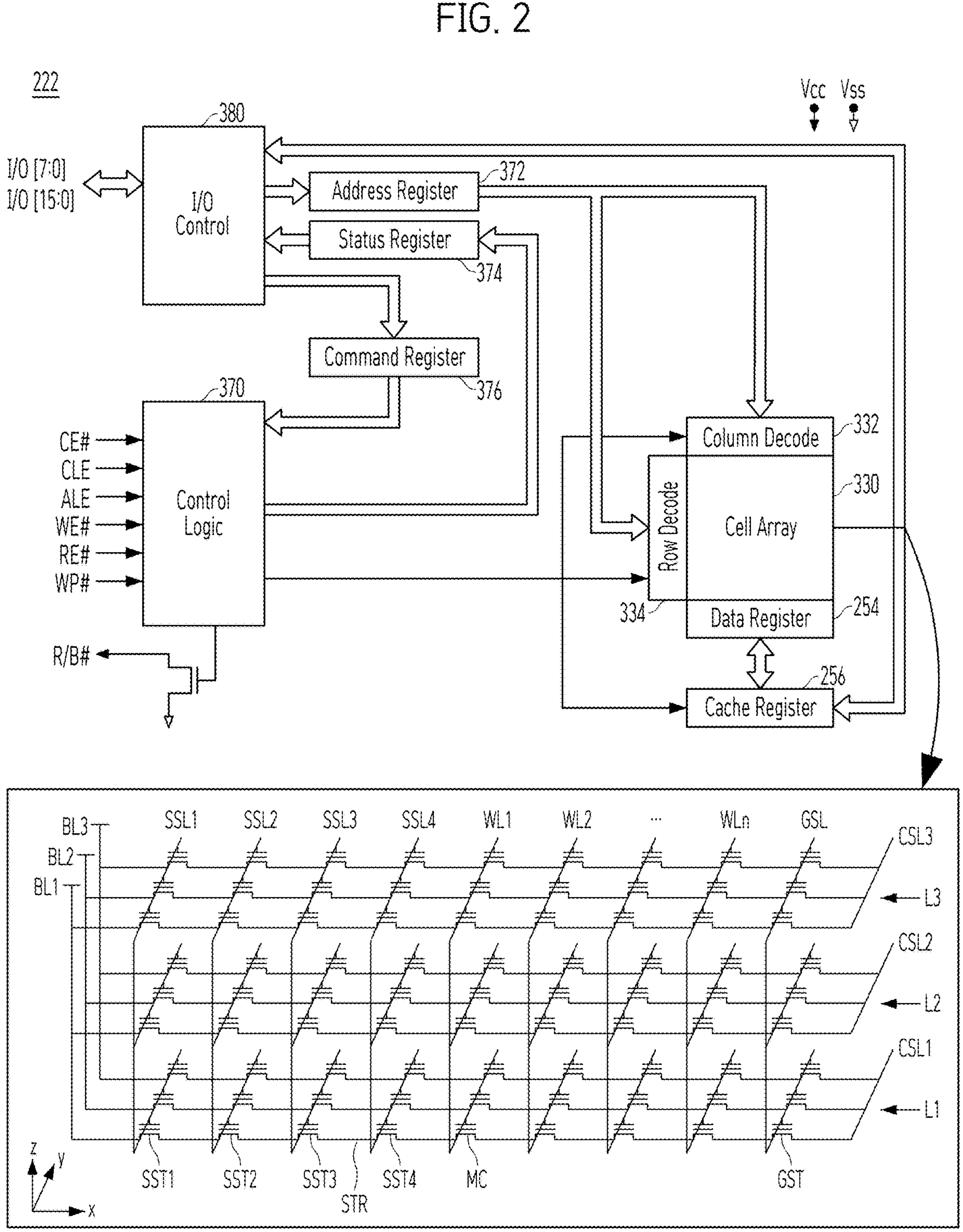
FIG. 2 illustrates a memory device according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components, e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software, to operate in a manner that is capable of performing the task(s) at issue. "Configured to" may also include adapting a manufacturing process, e.g., a semiconductor fabrication facility, to fabricate devices, e.g., integrated circuits, that are adapted to implement or perform one or more tasks.

As used in this disclosure, the term 'machine,' 'circuitry' or 'logic' refers to any or all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,'

'circuitry' or 'logic' also covers an implementation of merely a processor or multiple processors or a portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

An embodiment of the present disclosure can provide an apparatus and a method capable of improving performance of a memory device and a memory system including the memory device.

An embodiment of the present disclosure can dynamically change or adjust a physical region or location allocated as a system data area or a user data area in a memory device included in a memory system, based on a lifespan of the memory device.

Further, an embodiment of the present disclosure can improve a mechanism for using a reserve area to replace a bad block in a memory device included in a memory system. The memory system can allocate and use a super block to which a bad block belongs as a system data area or a user data area based on a location, a number, etc. of bad blocks, thereby reducing a size allocated as a reserve area in a memory device and enabling more regions to be used as the user data area.

An embodiment of the present disclosure can provide a memory system including a memory device comprising a plurality of memory blocks constituting a plurality of super blocks in which data is stored according to allocation information of each of the plurality of super blocks; and a controller configured to perform a bad block management operation when a memory block included in a first super block from among the plurality of super blocks is determined to be a bad block. The controller can be configured to, for the bad block management operation, change allocation information of the first super block based on a lifespan information of the first super block.

The controller can be configured to: change the allocation information of the first super block to system data when the lifespan information of the first super block is equal to or longer than a reference lifespan of a memory block storing system data in the memory device; and change the allocation information of the first super block to user data when the lifespan information of the first super block is shorter than the reference lifespan.

The controller can include estimated End Of Life (EOL) information based on Total Bytes Written (TBW) or Drive Writes per day (DWPD) in the lifespan information of the first super block.

The controller can be configured to: compare a first number of super blocks from among the plurality of super blocks whose allocation information is system data with a second number of super blocks from among the plurality of super blocks including the bad block; and determine the allocation information of the first super block based on a comparison result.

The controller can be configured to determine the allocation information of the first super block as system data when the second number is equal to or greater than the first number.

The controller can be configured to select an operable block for replacing the bad block from the plurality of memory blocks included in at least one super block whose allocation information is system data from among the plurality of super blocks.

The controller can be configured to determine allocation information of consecutive super blocks, comprising the first super block and at least one super block adjacent to the first super block from among the plurality of super blocks as system data when the second number is less than the first number.

The controller can be configured to select an operable block for replacing the bad block from memory blocks the plurality of included in at least one super block whose allocation information is system data when a first number of super blocks whose allocation information is system data is greater than a preset threshold and the allocation information of the first super block is user data.

The controller can be configured to replace the bad block included in the first super block with an operable block from among the plurality of memory blocks in the memory device through the bad block management operation.

The memory device can include a second super block set as a reserve area. The controller can be configured to determine allocation information of the second super block as user data after performing the bad block management operation for the first super block.

Another embodiment of the present disclosure can provide a memory system including a memory device divided into a system data area and a user data area, each data area including a plurality of memory blocks constituting a plurality of super blocks; and a controller configured to set a first reconstructed super block by replacing a bad block with an operable block from among the plurality of memory blocks when at least one of memory blocks included in a first super block from among the plurality of super blocks is the bad block. The controller can be further configured to: compare a first number of super blocks including at least one bad block with a second number of super blocks allocated to the system data area; and set the first reconstructed super block to the system data area or the user data area based on the a comparison result.

The controller can be configured to: include the first reconstructed super block in the system data area if the first number is equal to or greater than the second number; and search for an operable block in the plurality of memory blocks in the system data area.

The controller can be configured to include at least one super block adjacent and contiguous to the first reconstructed super block in the system data area when the first number is less than the second number.

The first reconstructed super block included in the system data area and a super block included in the user data area are physically separate from each other.

The controller can be configured to set the first reconstructed super block to the system data area or the user data area, based on lifespan information of the operable block and the data area of the first super block including the bad block.

The controller can be configured to: include the first reconstructed super block in the system data area if the lifespan information of the operable block is equal to or greater than a reference lifespan of the system data area; and include the first reconstructed super block in the user data area if the lifespan information of the operable block is shorter than the reference lifespan.

The controller can be configured to select the operable block to replace the bad block among plural memory blocks included in super blocks belonging to the system data area when the bad block is included in a second super block in the user data area.

The controller can be configured to include the first reconstructed super block in the user data area when lifespan information of the first reconstructed super block is greater than the reference lifespan of the system data area.

Another embodiment of the present disclosure can provide a memory system including a memory device divided into a system data area, a user data area, and a reserved area, each area including a plurality of memory blocks constituting a plurality of super blocks; and a controller for performing a bad block management operation when at least one of the plurality of memory blocks included in a first super block among the plurality of super blocks is determined to be a bad block. The controller can be configured to, through the bad block management operation, change at least one super block allocation from the reserved area to the user data area, or to replace the bad block with an operable block from among the plurality of memory blocks included in at least one super block included in the system data area.

The controller can be configured to change an area to which the first super block is allocated based on lifespan information of the first super block and a reference lifespan of the system data area.

These and other features and advantages of the invention will become apparent from the detailed description and the accompanying drawings of embodiments of the present disclosure. Embodiments will now be described with reference to the accompanying drawings, wherein like numbers reference like elements.

Figure 1:
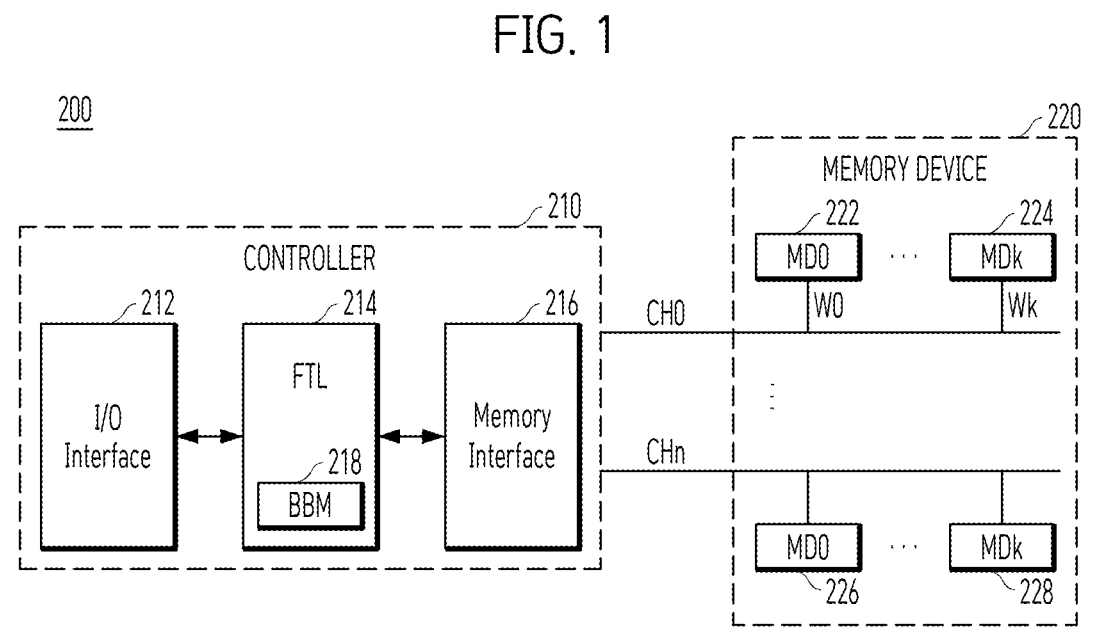

FIG. 1 illustrates a memory system according to an embodiment of the present disclosure.

Referring to FIG. 1, a memory system 200 can include a controller 210 and a memory device 220. Depending on the embodiment, the memory system 200 can be implemented as one of various types of storage devices, such as a solid state drive (SSD), an MMC, an embedded MMC (eMMC), a reduced size MMC (RS-MMC), a multi-media card (MMC) in the form of a micro-MMC, a secure digital (SD) card in the form of an SD, mini-SD, or micro-SD, a universal storage bus (USB) storage device, a universal flash storage (UFS) device, a compact flash (CF) card, a smart media (Smart Media) card, or a memory stick.

Depending on the embodiment, the controller 210 can include an I/O interface 212, a flash translation layer (FTL) 214, and a memory interface 216. The controller 210 can include various components. Depending on performance of the memory system 200 or the controller 210, components within the controller 210 can vary. The memory device 220 can include a plurality of memory dies 222, 224, 226, 228. Each of the plurality of memory dies 222, 224, 226, 228 can include a plurality of data storage areas (e.g., memory blocks, memory pages, memory planes, etc.). The storage areas can be distinguished according to the number of bits of data that can be stored or expressed in a single memory cell. The memory block included in the memory device 220 can include single level cells (SLC), double level cells (DLC), triple level cells (TLC), quadruple level cells (QLC), or multiple level cells constituting a plurality of pages. The memory cells can be designed to store 5 bits or more of bit data in one memory cell. A specific configuration of the memory device 220 will be described later with reference to FIG. 3.

According to an embodiment, the memory device 220 may be implemented as a memory device such as a Read Only Memory (ROM), a Mask ROM (MROM), a Programmable ROM (PROM), an Erasable ROM (EPROM), an Electrically Erasable ROM (EEPROM), a Phase change RAM (PRAM), a Magnetic RAM (MRAM), a NAND or NOR flash memory, a Phase Change Random Access Memory (PCRAM), a Resistive Random Access Memory (RRAM), a Ferroelectric Random Access Memory (FRAM), or a Spin Transfer Torque Magnetic Random Access Memory (STT-MRAM).

The controller 210 can be coupled to the memory device 220 through at least one channel CH0, CHn and at least one way W0, Wk. The controller 210 can transmit commands, write data, etc. through the at least one channel CH0, CHn and the at least one way W0, Wk, and the memory device 220 can transmit responses, read data, etc. corresponding to the commands through the at least one channel CH0, CHn and the at least one way W0, Wk.

The I/O interface 212 in the controller 210 can receive data or commands transmitted from an external device. In addition, the I/O interface 212 can output data or responses to be transmitted to an external device. The I/O interface 212 can perform data communication through a preset protocol with the external device. There are various interface protocols such as USB (Universal Serial Bus), MMC (Multi-Media Card), PATA (Parallel Advanced Technology Attachment), SCSI (Small Computer System Interface), ESDI (Enhanced Small Disk Interface), IDE (Integrated Drive Electronics), PCIE (Peripheral Component Interconnect Express), SAS (Serial-attached SCSI), SATA (Serial Advanced Technology Attachment), and MIPI (Mobile Industry Processor Interface) as examples of agreed upon standards for transmitting and receiving data or commands.

The flash translation layer (FTL) 214 within the controller 210 can control processing and transfer of tasks between components within the controller 210 and manage a mapping between an address used by external devices and an address used by the memory device 220. For example, the flash translation layer (FTL) 214 can manage the mapping between logical addresses and physical addresses, thereby determining a storage location of data entry and performing operations for managing a lifespan of the memory device 220. Depending on an embodiment, the flash translation layer (FTL) 214 can manage events received from the I/O interface 212, manage map data, track and monitor operational status for performing garbage collection or wear leveling, or perform scheduling for commands performed within the memory device 220.

The flash translation layer (FTL) 214 may include a bad block manager 218. The bad block manager 218 can determine whether a memory block included in the memory device 220 is available for inputting and outputting data (e.g., whether a memory block is operable). If a defect is found in a memory block during the manufacturing process, the memory block can be determined as a bad block that cannot be used (e.g., inoperable). After manufacturing, for multiple memory blocks in the memory device 220, the controller 210 or an external device can test or check whether each memory block stores data and outputs the stored data.

The memory device 220 may not be able to guarantee reliability due to wear and tear, etc. after performing a data input/output operation requested by the external device. The controller 210 can check the operating status of the memory block in the memory device 220. When it is determined that reliability cannot be guaranteed, the memory block can be determined as a bad block. Detailed operations of the bad block manager 218 will be described later with reference to FIGS. 4 to 9.

The memory device 220 can be divided into several areas. For example, the memory device 220 may include a system data area, a user data area, and a reserved area. Specifically, the system data area is a place where at least one firmware, etc., used for the operations of the controller 210 may be stored. The system area can be an area (e.g., Physical Address Area) that can be accessed by a physical address only, such as a physical block address of the memory device 220, and not a logical address. Therefore, even if the memory system 200 including the memory device 220 is operably engaged with a computing device, which is an external device, a user might not be able to access the system data area through the computing device. According to an embodiment, access to the system data area could be permitted for limited purposes by a special command or program. The system data area can store basic information for recognizing hardware in the memory system 200 or the memory device 220, firmware for supporting the basic operation of the memory system 200, etc.

The system data area is allocated for the operations of the memory system 200, and importance of the data entries stored therein is higher than in other areas. However, data input/output might not occur as frequently in the system data area as in other areas. Therefore, the controller 210 can set a standard for the memory block used as the system data area. According to an embodiment, the memory block used as the system data area might have a lower standard or reference regarding a read count and a write/delete count than a memory block used as the user data area. For example, if the write/delete count of a specific memory block is '200', then the memory block can be used as the user data area, but might not be used as the system data area.

The user data area can store user data entries to be transmitted to a computing device, which is an external device to which the memory system 200 links. Representative data entries included in the user data area can include an operating system (OS), file system information, application programs, etc.

The user data area can be an area (Logical Address Area) that is accessed using a logical address or a logical block address, etc. For example, a Logical Block Address (LBA) is a format used to specify the location of a data block recorded in a storage device linked to a computing device, according to the Logical Block Addressing method. In a conventional hard disk, an addressing method that indicates the cylinder, head, and sector (Cylinder-Head-Sector, CHS), which are physical structures included in the hard disk, was used. However, the address system corresponding to the physical structure of the hard disk reached its limit as the storage capacity of the hard disk increased. In a large-capacity storage device, addresses can be specified by arranging sectors in a logical order in a row (e.g., starting from 0) without corresponding to the physical structure of the hard disk and assigning numbers to the sectors. Instead of a computing device (e.g., a host 110, see FIG. 10) that can be coupled to the memory system 200 transmitting or pointing to data only with a logical block address LBA, the controller 210 included in the memory system 200 needs to manage the matching of a physical address, which is an address in a memory device 220 where a data entry is actually stored, and a logical block address LBA used by the host 110. Such information can be included in metadata and can be distinguished from user data entries stored or read through the host 110.

The reserved area in the memory device 220 is an area that can be used to store information for operation with a computing device or other system to which the memory system 200 is coupled, or for a configuration added to the memory system (200) according to an embodiment of the present disclosure. The reserved area, like the system data area, can be an area (Physical Address Area) that can be accessed only with a physical address such as a physical block address (PBA). Further, the memory system 200 can store data in the reserved area to support various operations required or needed during a manufacturing process, a process of configuring or mounting on the host 110 or the computing device, or a process of performing operations in conjunction with the host 110 or the computing device. If the system data area is for supporting the basic operation of the memory system, the reserved area can be used for expanding operations supported by the memory system. In addition, according to an embodiment, the reserved area can include at least one memory block reserved and used to replace a bad block included in the system data area or the user data area, when the memory block in the system data area or the user data area is determined to be a bad block.

FIG. 2 illustrates a memory device according to an embodiment of the present disclosure.

Referring to FIGS. 1 and 2, a memory device 220 can include at least one memory die 222. The memory die 222 can receive or output a plurality of control signals CE#, CLE, ALE, WE#, RE#, WP#, R/B#, and receive or transmit data or operation information through channels I/O[7:0], I/O[15:0]. For example, a predetermined amount of data (e.g., 1 byte (8 bits) or 2 bytes (16 bits)) can be transmitted and received according to a channel (e.g., I/O[7:0], I/O[15:0]) coupling the memory device 220 and a controller 210.

A cell array 330 storing data entries can include a plurality of memory cells. The plurality of memory cells may be arranged in row and column directions and can have a three-dimensional structure. The cell array 330 can include volatile memory cells or non-volatile memory cells. In addition, each volatile memory cell or non-volatile memory cell can store at least 1 bit of data. The plurality of memory cells may be connected to a word line. When the word line is activated, data stored in the plurality of memory cells can be output to through bit lines.

According to an embodiment, the cell array 330 can be stacked in the vertical direction (Z), and non-volatile memory cells can be placed in three-dimensional (3D) space. For example, the cell array 330 can include a plurality of memory cells MC arranged in a cell string STR in a plurality of memory layers (e.g., three memory layers L1, L2, L3). Each memory layer L1, L2, L3 is connected to a plurality of bit lines BL1, BL2, BL3 through a first end of the plurality of channel lines from a plurality of strings STR, each string including the plurality of memory cells MC, and to a common source line CSL through a second end of the plurality of channel lines. The memory device 220 may include a plurality of source selection lines SSL1 to SSL4 connected to source select transistors SST1 to SST4. In addition, a plurality of word lines WL1 to WLn and a ground selection line GSL may be connected to each of the memory layers L1, L2, L3. The plurality of source selection lines SSL1 to SSL4, the plurality of word lines WL1 to WLn, and the ground selection line GSL may be arranged in a direction that intersects the plurality of channel lines. Each of the plurality of channel lines may be described as the cell string STR. Each of the cell strings STR may include the source select transistors SST1 to SST4 respectively connected to the plurality of source selection lines SSL1 to SSL4. The ground selection line GSL may be grounded to turn off the ground selection transistor GST.

The plurality of word lines WL1 to WLn may each be connected to control gates of memory cells arranged in a column direction (e.g., x-direction). Each of the plurality of bit lines BL1 to BL3 may be connected to one end of the source select transistors. A plurality of memory cells having control gate electrodes connected to each word line WL1 to WLn in the row direction can configure a page, which is a unit for storing data or a data entry. The number of pages may be changed or determined depending on a storage capacity of the memory cells.

According to an embodiment, the memory die 222 can include a plurality of pins or pads. For example, the plurality of control signals CE#, CLE, ALE, WE#, RE#, WP#, R/B# can be transmitted or received through exclusively allocated pins. The control signals can include a chip enable signal CE#, a command latch enable signal CLE, an address latch enable signal ALE, a write enable signal WE#, a read enable signal RE#, a write protect signal WP#, a status signal R/B# indicating a ready state or a busy state, and the like. The control signals CE#, CLE, ALE, WE#, RE#, WP#, R/B# can be controlled (transmitted and received) by a control logic 370 in the memory die 222.

The memory die 222 can include an input and output (input/output (I/O)) control circuit 380. The input/output control circuit 380 can be connected to other devices or components (e.g., a controller) through the channels I/O[7:0], I/O[15:0]. The input/output control circuit 380 in the memory die 222 can be coupled to a plurality of registers 372, 374, 376 and a cache register 256, which is coupled to a cell array 330.

According to an embodiment, the input/output control circuit 380 can include a chip select decoder, while the memory die 222 may include a plurality of memory chips. Chip select function may be used to activate one of the plurality of memory chips included in or connected to a memory system or a data processing system. Depending on the embodiment, the chip select decoder may be implemented with combinational logic gates that activate one specific output line in response to an input binary code. The memory system or the data processing system can use an activated output line to activate or "select" a specific chip or device from multiple devices connected to the memory system or the data processing system. For example, if there are multiple memory chips on a same bus (such as flash memory chips in solid state drives (SSDs)), for most operations it is impossible to communicate with all memory chips simultaneously because data entries or commands sent across the bus could be routed to all memory chips. Instead, a chip select signal can be used to select which chip to communicate with at any given time. The chip select decoder can manage and control data communication between multiple devices (e.g., the multiple memory chips) that share the same bus or connection lines in a system by activating one specific device based on an input select code/signal.

According to an embodiment, the memory die 222 may include the cache register 256, an address register 372, a status information register 374, and a command register 376. The cache register 256 can temporarily store data. When the memory die 222 performs a read operation, the cache register 256 can store a read data entry output from the cell array 330. When the memory die 222 performs a write operation or a program operation, the cache register 256 can store a write data entry. The address register 372 can store an address indicating a location of the cell array 330 where a read operation or a write operation is to be performed. The command register 376 can store a command to be executed by the memory die 222. The status information register 374 can store status information such as a result (failure/success) of an operation performed in the memory die 222 or readiness for performing an operation. For example, when a plurality of memory planes is included in a memory die, the status information register 374 can store status information regarding each of the plurality of memory planes. Data, commands, and information transmitted or received through the input/output control circuit 380 in the memory die 222 can be controlled (e.g., transmitted, moved, or output) by the control logic 370.

During a read operation in the memory die 222, a row decoder 334 and a column decoder 332 can select one or more memory cells in the cell array 330 based on an address stored in the address register 372 and a control signal from the control logic 370. During a read operation, a read data entry output from the cell array 330 may be stored in the data register 254 and then transferred from the data register 254 to the cache register 256. The read data entry stored in the cache register 256 is transferred to the input/output control circuit 380 through input/output lines. The read data entry transmitted to the input/output control circuit 380 can be output to the controller through the channels I/O[7:0], I/O [15:0].

During a write operation or a program operation in the memory die 222, the row decoder 334 and the column decoder 332 can select one or more memory cells in the cell array 330 in response to an address stored in the address register 372 and a control signal from the control logic 370. During the write operation, the write data entry transferred from the controller to the input/output control circuit 380 through the channels I/O[7:0], I/O[15:0] can be stored in the cache register 256. Thereafter, the write data entry can be transferred from the cache register 256 to the data register 254. The write data entry stored in the data register 254 can be programmed into selected memory cells in the cell array 330 by the control logic 370.

The data register 254 and the cache register 256 described in FIG. 2 can be included in a read/write circuit comprising a sense amplifier, a page buffer, or the like. According to an embodiment, page buffers or data latches included in the memory die 222 can correspond to the data register 254 and/or the cache register 256. Further, the cache register 256 is configured to temporarily store data transmitted between the data register 254 and the input/output control circuit 380. The cache register 256 may have a pipe latch structure depending on the embodiment.

A pipeline (or pipelining) system including at least one pipe latch, which can include an apparatus that can parallelize a plurality of data entries input and output serially. According to an embodiment, the pipeline system is applicable to the input/output control circuit 380 or the cache register 256. Further, according to an embodiment, the pipeline system may be used to compensate for delays and noise occurring in a data transmission process as a data path through which data is transmitted within the memory die 222 of the memory system becomes longer.

Figure 3:
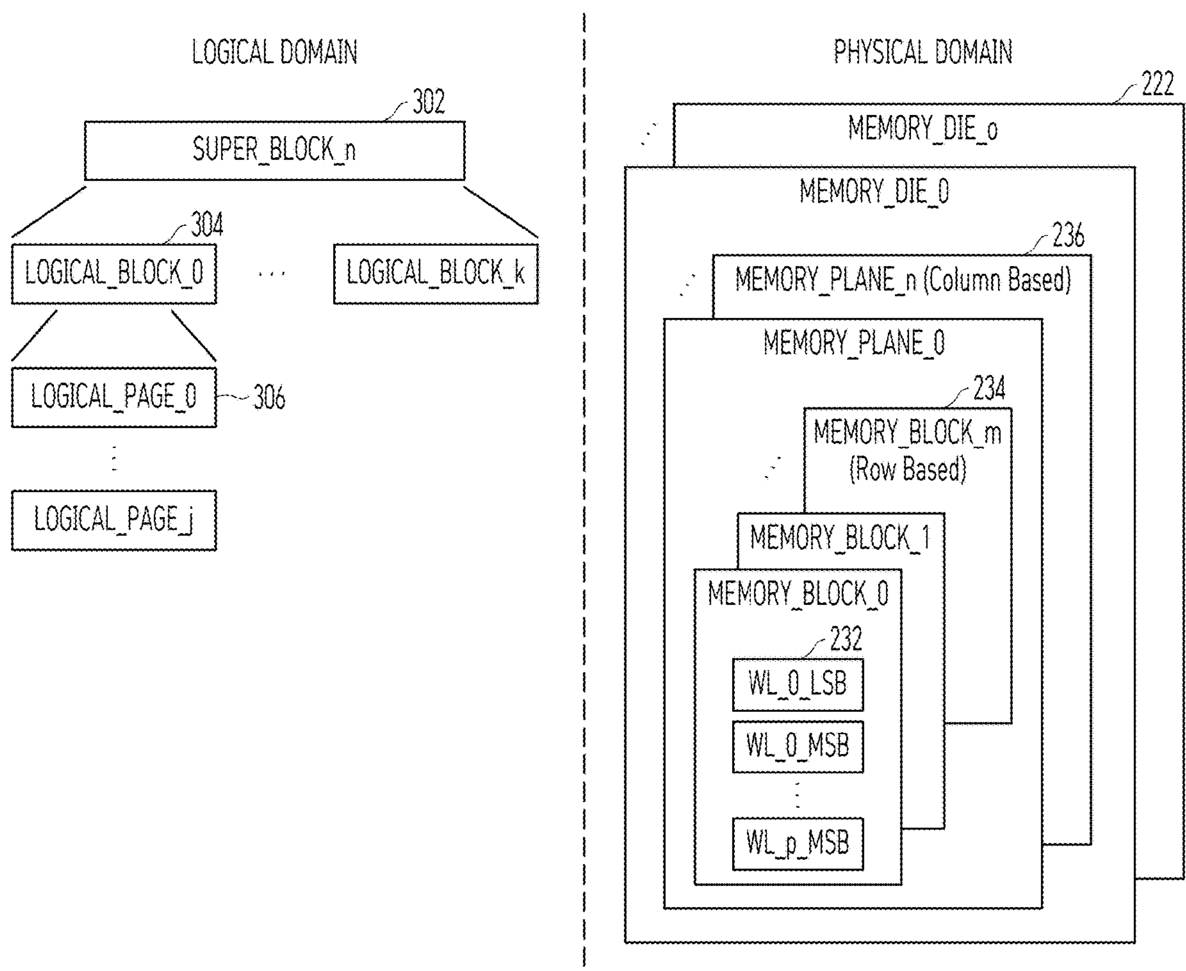
FIG. 3 illustrates a configuration of a memory device according to an embodiment of the present disclosure.

FIG. 3 illustrates a configuration of a memory device according to an embodiment of the present disclosure. Specifically, referring to FIGS. 1 to 3, an internal configuration of a memory device 220 and a method for accessing the internal configuration of the memory device 220 are described.

Referring to FIG. 3, in a physical domain, the memory device 220 can include a plurality of memory dies 222 (e.g., MEMORY_DIE_0, MEMORY_DIE_0). Each memory die (e.g., MEMORY_DIE_0) can include a plurality of memory planes 236 (e.g., MEMORY_PLANE_0, . . . , MEMORY_PLANE_n). Each memory plane (e.g., MEMORY_PLANE_0) can include a plurality of memory blocks 234 (e.g., MEMORY_BLOCK_0, MEMORY_BLOCK_1, . . . , MEMORY_BLOCK_m). Each memory block (e.g., MEMORY_BLOCK_0) can include a plurality of pages 232 (e.g., WL_0_LSB, WL_0_MSB, . . . , WL_p_MSB). The number of pages 232 (e.g., WL_0_LSB, WL_0_MSB, . . . , WL_p_MSB) can be determined based on the number of word lines and the number of bits of data stored in each memory cell.

According to an embodiment, a memory block (e.g., MEMORY_BLOCK_0) can correspond to a memory block in which a plurality of memory cells included in the three-dimensional cell array 330 described in FIG. 2 are divided into multiple row units. A memory plane (e.g., MEMORY_PLANE_0) can correspond to a memory plane in which multiple column units are divided. The multiple row units can be a preset number of row groups that may vary depending on the arrangement and structure of local word lines, global word lines, etc. Likewise, the multiple column units can be a preset number of column groups (e.g., string groups) that may vary depending on arrangement and structure of local source lines, global source lines, etc. For example, the cell array 330 can include memory blocks, each divided into 32-, 64-, or 128-word line units. The cell array 330 can include memory planes, each divided into 8- or 16-string units.

Referring to FIG. 3, in a logical domain, the memory device 220 can include a plurality of super blocks 302. Each super block 302 can include a plurality of logical blocks 304. Each logical block 304 can include a plurality of logical pages 306.

According to an embodiment, sizes of each logical block 304 and each memory block 234 can be the same, and sizes of each logical page 306 and each page 232 can be the same. In another embodiment, the sizes of each logical block 304 and each memory block 234 can have a multiple relationship (e.g., 0.2 times, 0.5 times, 2 times, 4 times, or etc.). The sizes of each logical page 306 and each page 232 can have a size relationship that is 1:1 or a size multiple. These relationships can be determined based on the internal configuration of the memory device 220 and the usage environment of a memory system 200 (e.g., a protocol agreed upon for performing data communication with a host 102, which is an external device).

The configuration of the memory device 220 in the logical domain can vary depending on an embodiment. In the physical domain, as the number of memory cells included in the memory device 220 per unit area or unit volume increases, storage capability of data that can be stored in the memory device 220 also increases. As the storage capability of data that can be stored increases, a scheme can be designed and used to increase efficiency in inputting and outputting data (e.g., throughput). For example, the internal configuration of the memory device 220 in the logical domain can be designed to improve the efficiency of data input/output.

A flash translation layer (FTL) 214 described in FIG. 1 can perform a mapping operation that associates an element in the logical domain for the memory device 220 with an element in the physical domain. In addition, a bad block manager 218 can determine a defect in the corresponding element based on status information regarding the element in the physical domain corresponding to the element in the logical domain and perform a bad block management operation to replace the defect with an operable element.

According to an embodiment, a controller 210 can determine allocation information for each super block 302. Herein, the allocation information can indicate a type of data stored in the corresponding super block or can indicate an area to which the corresponding super block belongs. For example, the memory device 220 can be divided into a system data area that stores system data and a user data area. If allocation information of a first super block is set to system data, then the first super block can be understood as being used to store system data and belong to the system data area. If allocation information of a second super block is set to user data, then the second super block can be understood as being used to store user data and belong to the user data area. The controller 210 can maintain and manage the system data area and the user data area by changing the allocation information of each super block 302.

According to an embodiment, the controller 210 can calculate, manage, and store lifespan information for a memory block or a super block included in the memory device 220. For example, the lifespan information can be calculated or estimated based on a program-erase cycle (P/E cycle) of the memory block. Further, the lifespan information can include estimated End Of Life (EOL) information based on Total Bytes Written (TBW) or Drive Writes per day (DWPD).

Hereinafter, a bad block management operation performed by the controller 210 will be described with reference to FIGS. 4 to 9. For convenience of explanation, FIGS. 4 to 9 illustrate each of eight super blocks 302 (e.g., VSBN0 to VSBN7) that can include eight memory planes 308 (e.g., P0 to P7 in a super block). Here, each of eight memory planes 308 can correspond to a memory plane (e.g., MEMORY_PLANE_0) described in FIG. 3. The eight memory planes 308 (e.g., P0 to P7 across all eight super blocks) can be included in a single memory die 222 or can be distributed over a plurality of memory dies 222, 224, 226, 228 described in FIG. 1. Herein, the bad block management operation is described in a logical domain. The physical elements corresponding to the logical elements can vary depending on the embodiment.

Figure 4:
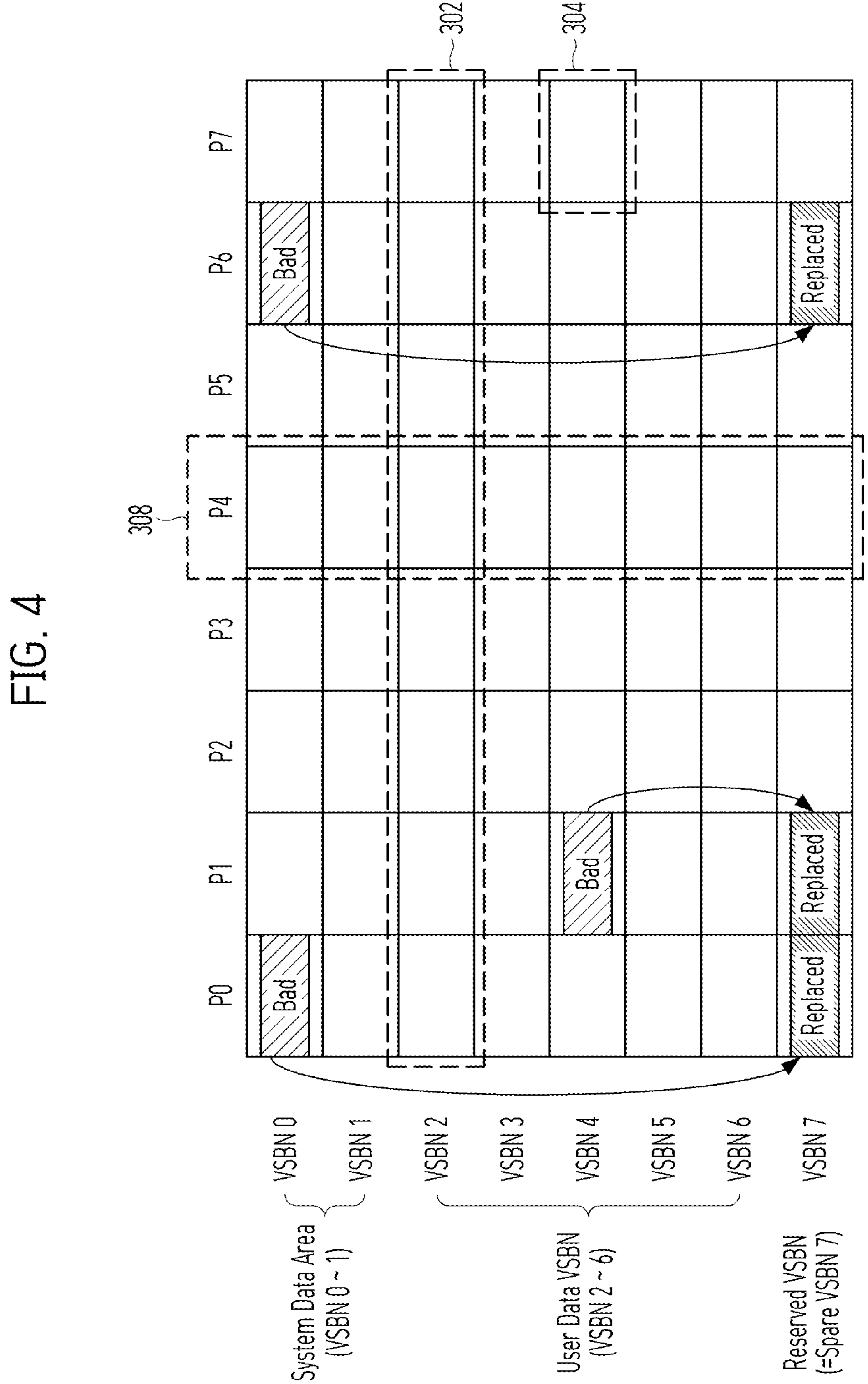
FIG. 4 illustrates a first bad block management operation of a memory system according to an embodiment of the present disclosure.

FIG. 4 illustrates a first bad block management operation of a memory system according to an embodiment of the present disclosure.

Referring to FIG. 4, a memory device can include a system data area, a user data area, and a reserved area. A first super block VSBN0 and a second super block VSBN1 are allocated to the system data area, a third super block VSBN2 to a seventh super block VSBN6 are allocated to the user data area, and an eighth super block VSBN7 is allocated to the reserved area.

Defects are found in two memory blocks (e.g., VSBN0-P0, VSBN0-P6) included in the first super block VSBN0, and another defect is found in one memory block (e.g., VSBN4-P1) included in the fifth super block VSBN4. A first bad block management operation can replace all bad blocks included in the first super block VSBN0 and the fifth super block VSBN4 with operable blocks in the eighth super block VSBN7 belonging to the reserved area. In FIG. 4, each bad block can be replaced with an operable block belonging to the same memory plane.

Through a first bad block management operation after the memory device is manufactured, at least one bad block (such as a Manufacture Bad Block MBB) in which an initial defect occurs can be replaced with a reserved memory block (Reserved Block) included in the reserved area. The first bad block management operation, however, can result in the disadvantage of having to secure sufficient operable blocks within the reserved area for replacing plural bad blocks found in the system data area and the user data area.

By reducing the number of reserved blocks and increasing the number of operable blocks in the user data area, performance of the memory device or the memory system can be improved. However, because the first bad block management operation replaces the first super block VSBN0 belonging to the system data area with an operable block without considering the lifespan of the memory block taken from the system data area, replacing the first super block with an operable block within the reserved memory blocks might not be efficient.

Figure 5:
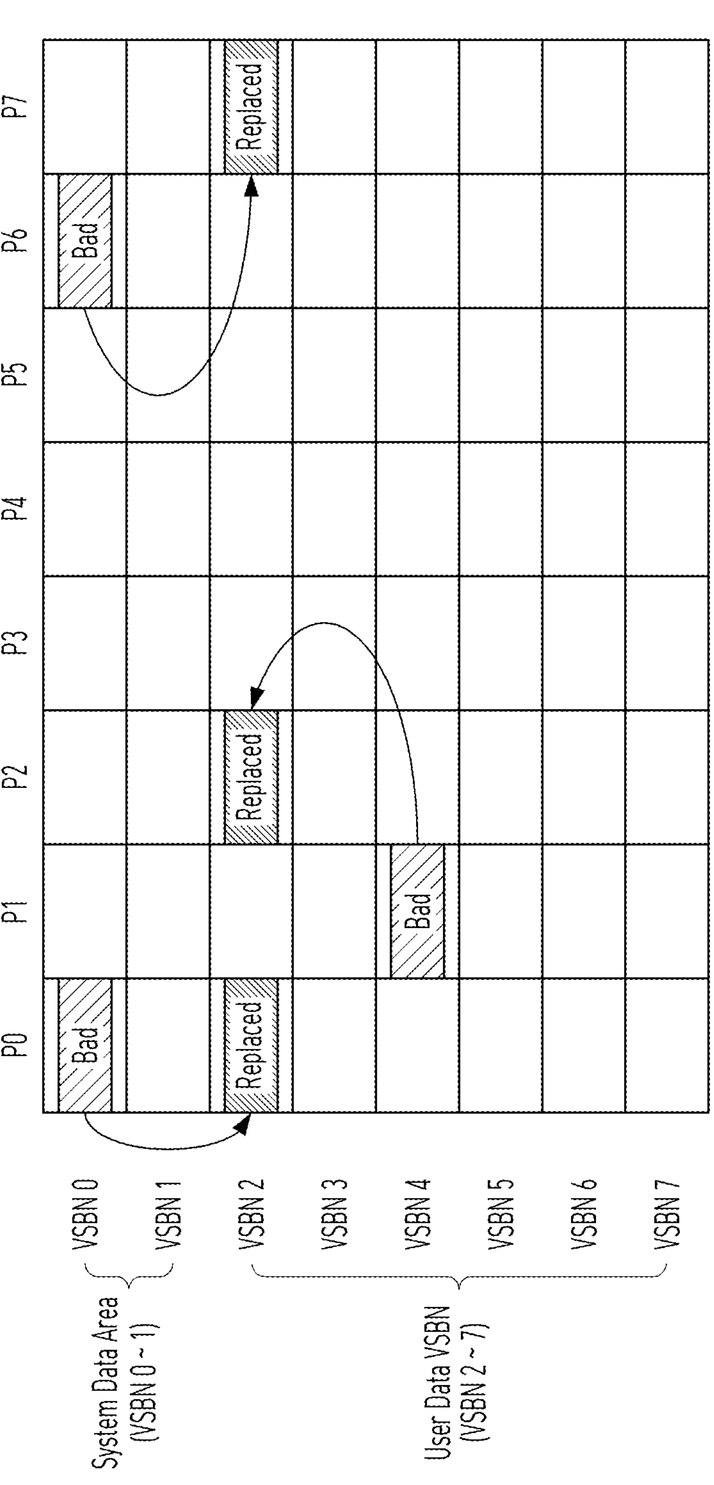
FIG. 5 illustrates a second bad block management operation of a memory system according to an embodiment of the present disclosure.

FIG. 5 illustrates a second bad block management operation of a memory system according to an embodiment of the present disclosure. In FIG. 5, a memory device is configured with a system data area and a user data area, but without a reserved area.

Referring to FIG. 5, a first super block VSBN0 and a second super block VSBN1 are allocated to the system data area, and a third super block VSBN2 through an eighth super block VSBN7 are allocated to the user data area.

Defects are found in two memory blocks (e.g., VSBN0-P0, VSBN0-P6) included in the first super block VSBN0, and another defect is found in one memory block (e.g., VSBN4-P1) included in the fifth super block VSBN4. The second bad block management operation can replace all bad blocks included in the first super block VSBN0 and the fifth super block VSBN4 with operable blocks in the third super block VSBN2 belonging to the user data area. While a bad block can be replaced with an operable block belonging to a same memory plane, according to an embodiment, the bad block can also be replaced with an operable block belonging to another memory plane. The second bad block management operation uses an operable block belonging to the user data area for replacement, so a memory block belonging to a reserve area is not used for bad block management. Thus, a bad block belonging to the system data area can be replaced with an operable block belonging to the user data area. Attributes, properties or characteristics of data entries input/output to the system data area and the user data area can be different. Therefore, operation states of the memory blocks belonging to the system data area and the user data area can be managed based on different criteria. The second bad block management operation may have a disadvantage in that it does not consider the lifespan of the first super block VSBN0, the lifespan of the system data stored in the system data area, the lifespan of the third super block VSBN2, or the like.

Figure 6:
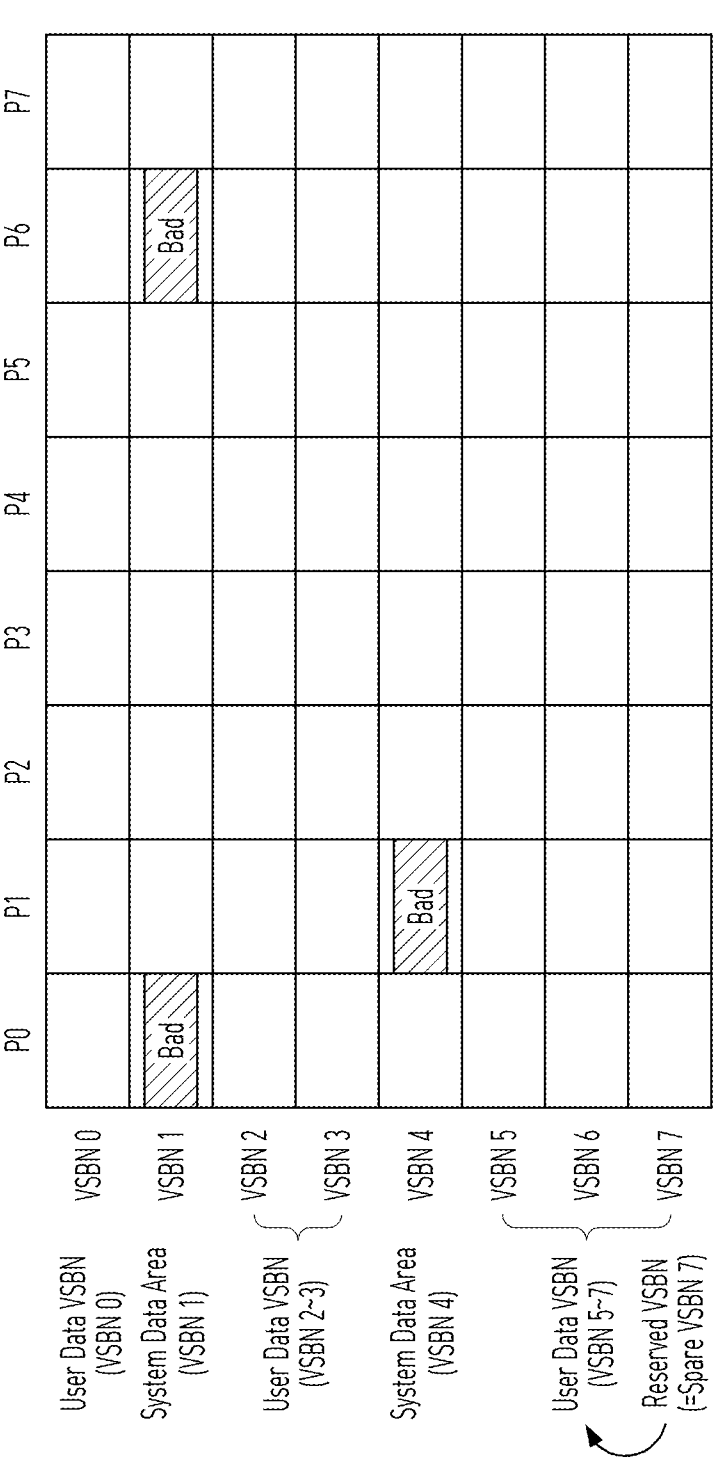
FIG. 6 illustrates a third bad block management operation of a memory system according to an embodiment of the present disclosure.

FIG. 6 illustrates a third bad block management operation of a memory system according to an embodiment of the present disclosure. In FIG. 6, an eighth super block VSBN7 belonging to a reserved area of the memory device is allocated to the user data area.

A first super block VSBN0 and a second super block VSBN1 are initially allocated to the system data area, and a third super block VSBN2 through an eighth super block VSBN7 are allocated initially to the user data area. Referring to FIG. 6, defects are found in two memory blocks (e.g., VSBN0-P0, VSBN0-P6) included in the second super block VSBN1, and another defect is found in one memory block (e.g., VSBN4-P1) included in the fifth super block VSBN4.

The third bad block management operation can check whether the second super block VSBN1 and the fifth super block VSBN4 can be used as system data areas. At this time, whether a memory block or a super block is used as, or allocated to, the system data area can be determined based on whether the memory block or the super block satisfies a criterion or condition adaptively set or determined based on an operating environment and required performance of the memory system 200.

In addition, whether the second super block VSBN1 and the fifth super block VSBN4 can be used or allocated to store system data can be determined based on lifespan information of the second super block VSBN1 and the fifth super block VSBN4. Here, lifespan information can be determined based on Drive Writes Per Day (DWPD). The DWPD can be a numerical value for how many times a day data can be stored (written) in the entire capacity of the memory system 200 during a warranty period of the memory system 200. For example, 1DWPD can rewrite the entire drive capacity once a day, and 3DWPD can rewrite the entire drive three times a day. In other words, assuming that the same amount of data is written every day, 3DWPD can guarantee a lifespan that is three times longer than 1DWPD. The system data area, unlike the user data area, is where firmware, etc. required for the operation of the memory system 200 are stored. Depending on the internal configuration of the memory system 200 and the performance of the memory system 200, the amount of system data written in the system data area can be estimated, and a lifespan of the memory block or super block allocated to the system data area can be calculated.

When the second super block VSBN1 and the fifth super block VSBN4 each have a lifespan that can be used as system data areas (i.e., if the second super block VSBN1 and the fifth super block VSBN4 can be used until End Of Life (EOL)), the third bad block management operation can allocate the second super block VSBN1 and the fifth super block VSBN4, which include bad blocks, to the system data area. Furthermore, the controller can allocate the first super block VSBN0, the third and fourth super blocks VSBN2, VSBN3, and the sixth super block VSBN5 through the eighth super block VSBN7, which do not have bad blocks, to the user data area.

Compared to the user data areas, the system data areas may have a smaller amount of data and a lower input/output frequency of data. Therefore, even if the second super block VSBN1 and the fifth super block VSBN4 including bad blocks are allocated to the system data area, there could be no or an insignificant impact on the operating performance of the memory system 200. Through the third bad block management operation, the memory system 200 can secure the safety of data in the system data area. Further, the memory system 200 can improve the performance of the user data area because the user data area does not have bad blocks. Thus, the errors occurring in data input/output operations can be reduced.

Figure 7:
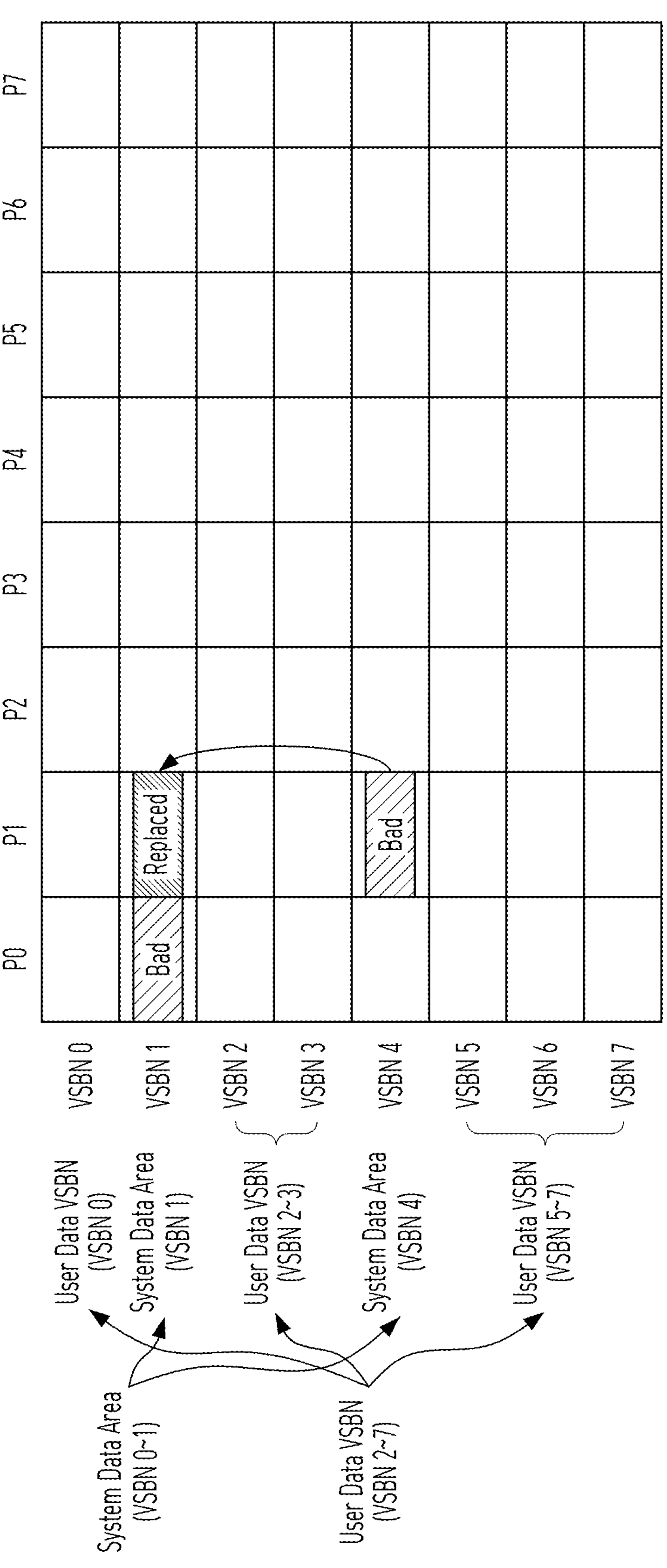
FIG. 7 illustrates a fourth bad block management operation of a memory system according to an embodiment of the present disclosure.

FIG. 7 illustrates a fourth bad block management operation of a memory system according to an embodiment of the present disclosure.

Referring to FIG. 7, a first super block VSBN0 and a second super block VSBN1 are initially allocated or assigned to the system data area, and a third super block VSBN2 through an eighth Super Block VSBN7 are initially allocated or assigned to the user data area. The memory system 200 finds defects in one memory block (e.g., VSBN0-P6) included in the second super block VSBN1 and one memory block (e.g., VSBN4-P1) included in the fifth super block VSBN4.

Similar to the third bad block management operation described above with reference to FIG. 6, the fourth bad block management operation can allocate or assign the second super block VSBN1 and the 5th Super Block VSBN4 with the bad blocks to the system data area. The first super block VSBN0, the third and fourth super blocks VSBN2, VSBN3, and the 6th Super Block VSBN5 through the eighth Super Block VSBN7 without any bad blocks can be allocated or assigned to the user data area.

Through the fourth bad block management operation, the memory system 200 can compare the first number of the bad blocks and the second number of the super blocks that need to be allocated or assigned to the system data area. For example, in FIG. 8, the first number of bad blocks is '2' and the second number of the super blocks that should be allocated or assigned to the system data area as replacements is also '2'. In FIG. 7, the fourth bad block management operation can replace one bad block (e.g., VSBN4-P1) included in the fifth Super Block VSBN4 with an operating block (e.g., VSBN1-P1) included in the second super block VSBN1. As a result, the fifth reconstructed super block VSBN4, replaced with the operating block (e.g., VSBN1-P1), can be used or operate as normal without a bad block in the system data area.

As shown in FIG. 7, when the first number of super blocks containing bad blocks is the same or less than the second number of the super blocks that need be allocated or assigned to the system data area, it might be possible that a super block without a bad block is allocated or used to the system data area. On the other hand, as shown in FIG. 6, when the first number of super blocks containing bad blocks is greater than the second number of the super blocks that should be allocated or assigned to the system data area, it might not be possible that a super block without a bad block is allocated to or used in the system data area. In this case, the memory system 200 can replace a bad block of the system data area with an operatable block included in a super block with a bad block from among the super blocks allocated or assigned to the user data area. In addition, even if the super block assigned to the system data area has an issue regarding an estimated lifespan based on a DWPD, the memory system 200 can use a super block with a bad block from among the super blocks allocated or assigned to the user data area to replace an unhealthy block in the system data area.

The memory system 200 can reduce the number of the super blocks including a bad block in the user data area through the fourth bad block management operation. Through these procedures, the memory system 200 can avoid deteriorating data input and output performance in the user data area. But the number of the super blocks including the bad block in the system data area could increase.

Figure 8:
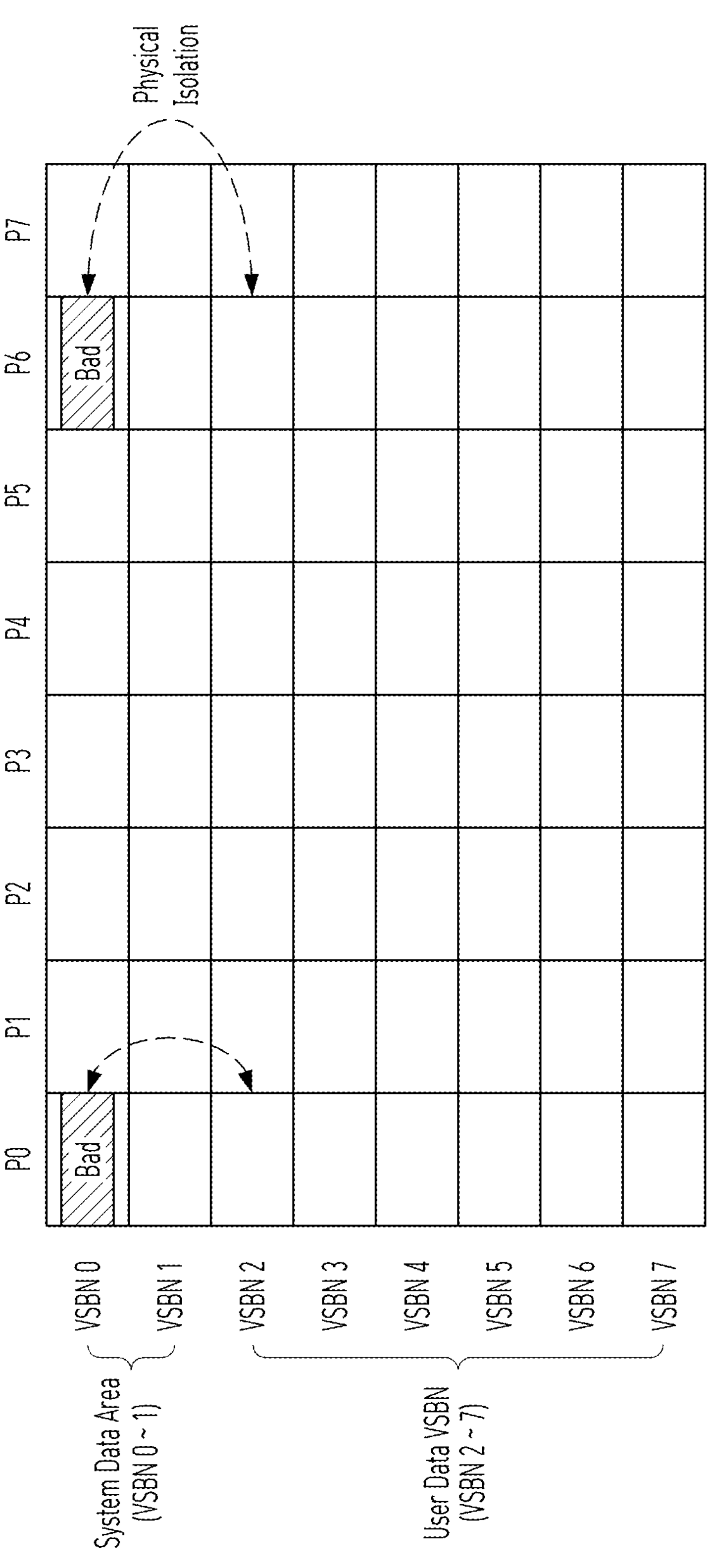
FIG. 8 illustrates a fifth bad block management operation of a memory system according to an embodiment of the present disclosure.

FIG. 8 illustrates a fifth bad block management operation of a memory system according to an embodiment of the present disclosure. In FIG. 7, a memory system 200 can determine whether a bad block is included in the super blocks included in the system data area or user data area within the memory device.

Referring to FIG. 8, only two bad blocks (e.g., VSBN0-P0, VSBN0-P6) are included in the first super block VSBN0 among the eight super blocks, and the other seven super blocks do not have a bad block.

Through the fourth bad block management operation, the memory system 200 can compare the first number of the bad blocks and the second number of the super blocks that should be allocated or assigned to the system data area. In FIG. 8, the first number of bad blocks is '2' and the second number of the super blocks that should be allocated or assigned to the system data area is '2'. If the first number is equal to, or less than, the second number, then the memory system 200 can allocate or assign successive super blocks including a super block containing a bad block to the system data area. Therefore, through the fifth bad block management operation, the memory system 200 can allocate or assign the second super block VSBN1, adjacent to the first super block VSBN0 containing the bad block, to the system data area and allocate or assign the third through the eighth super blocks VSBN2 to VSBN7 to the user data area.

Through the fifth bad block management operation, the system data area can be physically isolated from a location of the bad block. In response to the physical position, an order of the super block can be determined. On the other hand, another bad block is likely to occur in an area adjacent to the location of bad block in a manufacturing process. If the super block including the bad block and other super blocks adjacent to the super block is assigned to the system data area, the likelihood of bad blocks is less likely to occur in the user data area.

On the other hand, in a test process after the manufacturing process, the memory system 200 can collect information regarding the area that a bad block is likely to occur in advance. For example, the likelihood of a bad block can increase in a super block that is placed on an edge of the wafer or assigned to an edge of the chip. The memory system 200 can allocate or assign a super block to the system data area, when it is more likely that the bad block occurs in the super block, through the fifth bad block management operation.

Even if a super block containing a bad block is assigned to the system data area, data input and output in the system data area might insignificantly affect the operating performance of the memory system 200, as compared to data input and output in user data area with a bad block. Through the fifth bad block management operation, the memory system 200 can lower the occurrence of bad blocks in the user data area where the data input/output operations are more frequent for large amounts of data in the memory system 200. Thus, performance of the memory system 200 can be improved.

Figure 9:
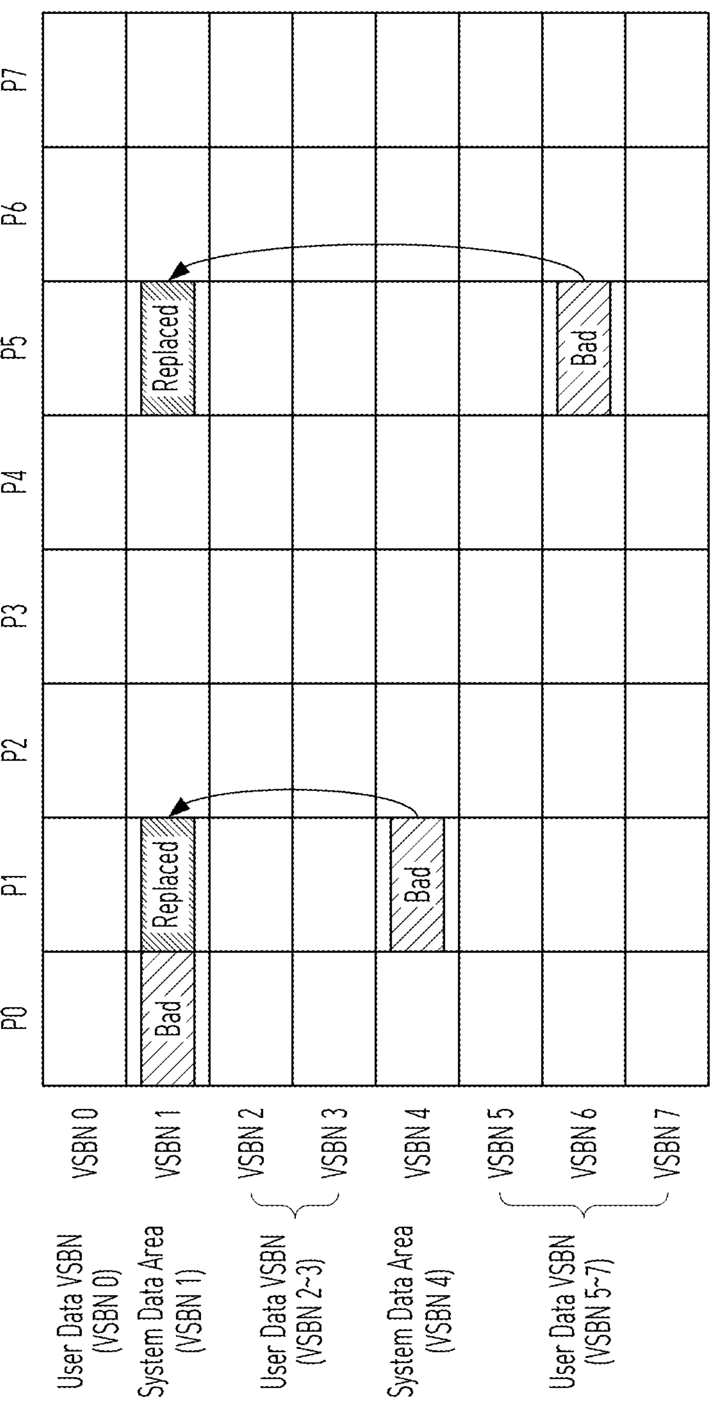
FIG. 9 illustrates a sixth bad block management operation of a memory system according to an embodiment of the present disclosure.

FIG. 9 illustrates a sixth bad block management operation of a memory system according to an embodiment of the present disclosure. FIG. 9 describes a further occurrence of one bad block (e.g., VSBN6-P5) in the seventh super block VSBN6 allocated or assigned to the user data area of a memory device described above with reference to FIG. 7.

Like the fourth bad block management operation described in FIG. 7, the first super block VSBN0, the third and fourth super blocks VSBN2, VSBN3, the sixth super block VSBN5, and the eighth super block VSBN7 without a bad block can be allocated or assigned to the user data area. When the system data area can include only two super blocks, the seventh super block VSBN6 with the bad block can be allocated or assigned to the user data area.

As described above, the sixth bad block management operation can replace one bad block (e.g., VSBN4-P1) included in the fifth super block VSBN4 with an operable block (e.g., VSBN1-P1) included in the second super block VSBN1. As a result, the fifth reconstructed super block VSBN4, replaced with the operable block (e.g., VSBN1-P1) in the second super block VSBN1, is assigned to the system data area and can be used as normal without a bad block.

Similarly, through a sixth bad block management operation, the memory system 200 can replace the bad block VSBN6-P5 included in the seventh Super Block VSBN6 with an operable block VSBN1-P5 included in the second super block VSBN1, which is allocated or assigned to the system data area. As a result, the seventh reconstructed super block VSBN6, replaced with the operable block VSBN1-P5 included in the second super block VSBN1, can be used in a normal state without a bad block in the user data area.

The amount of data stored in the system data area might not exceed a set or estimated range, unlike the user data area. If the number of super blocks assigned to the system data area is sufficient (for example, if the number of super blocks is greater than a preset threshold), it might be unnecessary to reallocate a super block with a bad block, from among the super blocks allocated to the user data area, to the system data area (e.g., change allocation information of the super block). The memory system 200 can avoid deterioration of data input and output in the user data area by replacing a bad block generated in the user data area with an operable block in a super block allocated or assigned to the system data area.

Figure 10:
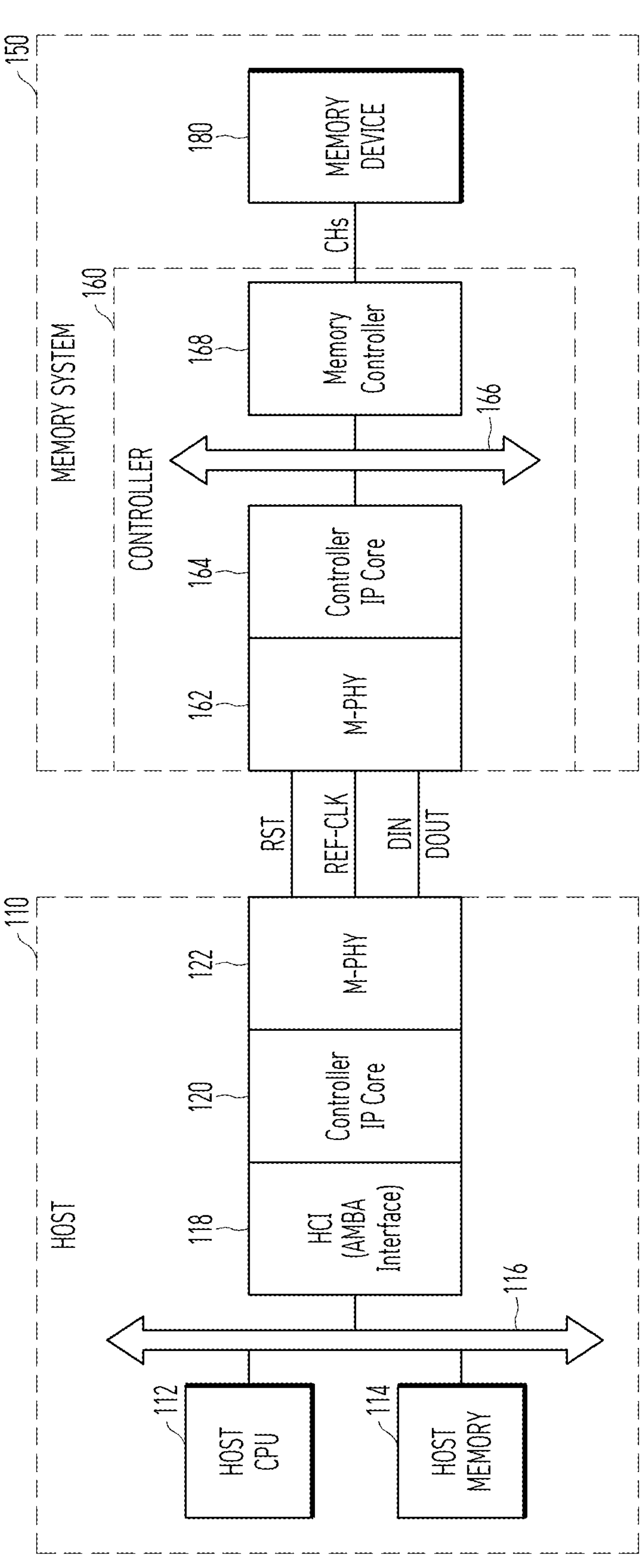
FIG. 10 illustrates a memory system according to an embodiment of the present disclosure.

FIG. 10 illustrates a memory system according to an embodiment of the present disclosure.

Referring to FIG. 10, a first data processing apparatus can include a host 110 and a memory system 150. The host 110 and the memory system 150 can include a Universal Flash Storage (UFS) electrical interface. The memory system 150 can have characteristics of UFS memory device. The characteristics can include low power consumption, high data throughput, low electromagnetic interference, and large memory subsystem efficiency optimization. The UFS electrical interface may be based on a differential interface suggested by a Mobile Industry Processor Interface (MIPI) M-PHY specification, which establishes and supports interconnection of the UFS interface with a MIPI Unified Protocol (UniPro) specification.

According to an embodiment, the host 110 can be an entity or a device that has the characteristics of a computing device that includes one or more Small Computer System Interface (SCSI) initiator devices. The host 110 and the memory system 150 may use a predetermined set of rules or procedures for data communication or a preset interface to transmit and receive data therebetween. Examples of sets of rules or procedures for data communication standards or interfaces supported by the host 110 and the memory system 150 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), United Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host 110 and the memory system 150 may be coupled to each other through a Universal Serial Bus (USB). The Universal Serial Bus (USB) is a highly scalable, hot-pluggable, plug-and-play serial interface that ensures cost-effective, standard connectivity to peripheral devices such as keyboards, mice, joysticks, printers, scanners, storage devices, modems, video conferencing cameras, and the like.

According to embodiments, the memory system 150 can be implemented as any of various types of storage devices such as a solid state drive (SSD), a multi-media card (MMC), an embedded MMC (eMMC), a reduced size MMC (RS-MMC), or a micro-MMC, a Secure Digital (SD) card in a form of the micro-SD, a Universal Storage Bus (USB) storage device, a Universal Flash Storage (UFS) device, a compact flash (CF) card, a Smart Media card, a Memory Stick, and etc.

The host 110 can include a host central processing unit (CPU) 112, a host memory 114, a bus interface 116, a host controller interface (HCI) 118, at least one controller IP core 120, and a physical layer 122. The host central processing unit 112 may be capable of executing at least one application. The host memory 114 may store data to be transmitted to the host central processing unit 112 or data generated by the host central processing unit 112. The bus interface 116 may be an interface for communication between components included in the host 110. The host controller interface 118 may output or receive data to or from an external device (e.g., memory system 150) coupled to the host 110. The at least one controller IP core 120 may perform various functions such as data, command or control signal transmission, error handling, power management, and the like. The physical layer 122 may perform communication based on the MIPI M-PHY specification.

The at least one controller IP core 120 can manage and control communication between the host 110 and the memory system 150. For example, the controller IP core 120 can be used to transmit data from the host 110 to the memory system 150, and to perform operations for detecting and recovering an error occurring in data that is transmitted from the memory system 150 to the host 110.

The physical layer 122 can perform communication according to a serial communication protocol developed by the Mobile Industry Processor Interface (MIPI) organization. The physical layer 122 can be designed for high-speed data transmission used in mobile devices and other low-power devices. The physical layer 122 can be used for communication between various devices such as mobile displays, cameras, sensors, memory, etc., depending on the embodiment. In particular, the physical layer 122 can support low-power operation so that the physical layer 122 can minimize power consumption to extend a life of a battery embedded in mobile devices. In addition, the physical layer 122 can provide a high bandwidth and a fast data transmission speed via a parallel processing scheme using a multi-lane architecture, meeting the needs of high-definition video and large file transmission.

The host controller interface 118 can provide communication with the at least one controller IP core 120 and other components coupled via the bus interface 116. For example, an AMBA (Advanced Microcontroller Bus Architecture) is a bus-based communication protocol and interface developed by ARM Ltd. . . . An AMBA interface, which includes AXI (Advanced extensible Interface), AHB (Advanced High-performance Bus), or APB (Advanced Peripheral Bus), can be used for communication between intellectual property (IP) cores in System-on-Chip (SoC) designs. Further, the bus interface 116 can also support exchange of data or control signals between various components and the at least one controller IP core 120, which are included in the host 110.

Referring to FIG. 10, the physical layer 122 in the host 110 can transmit or receive, to or from the memory system 150, a reset signal (RST), a reference clock (REF-CLK), input data or write data (DIN), and output data or read data (DOUT).

The memory system 150 can include a controller 160 and a memory device 180. Herein, the memory device 180 may include at least one data storage space including volatile memory cells or non-volatile memory cells. A description of the memory device 180 will be described later with reference to FIG. 11.

The controller 160, which is coupled to the memory device 180 through at least one channel (CHs), can receive signals, commands, or data input from the host 110 and perform operations responsive to the signals, the commands, the data. For example, the controller 160 can store data in the memory device 180 when the data is input from the host 110. The controller 160 can transmit, to the host 110, data, which is requested by the host 110 and received from the memory device 180. The controller 160 may include a physical layer 162, at least one controller IP core 164, a bus interface 166, and a memory controller 168.

The controller 160 included in the memory system 150 can include the physical layer 162 that is substantially similar to the physical layer 122 included in the host 110. The physical layer 162 may receive or transmit signals or data transmitted from or to the host 110. For example, the physical layer 162 and the physical layer 122 can operate as counter parts to each other.

According to an embodiment, the at least one controller IP core 164 in the memory system 150 can be substantially the same as the at least one controller IP core 120 in the host 110. In another embodiment, the at least one controller IP core 164 can be different from the at least one controller IP core 120. The configuration of the at least one controller IP core 164 can be determined or established in response to the bus interface 166 that supports communication between various components included in the memory system 150.

The memory controller 168 may be designed or configured based on the configuration of the memory device 180. For example, when the memory device 180 is a flash memory, the memory controller 168 may support communication with a flash memory such as a NAND or NOR device. For example, the memory controller 168 can support communication schemes and protocols set in the ONFI (Open NAND Flash Interface). The ONFI can use a data path (e.g., a channel, a way, etc.) that includes signal lines that are capable of supporting bidirectional transmission and reception of 8-bit or 16-bit data units between different components. Data communication between the controller 160 and the memory device 180 can be performed through a device that supports an interface designed for at least one scheme among asynchronous SDR (Asynchronous Single Data Rate), synchronous DDR (Synchronous Double Data Rate), and Toggle DDR (Toggle Double Data Rate).

Figure 11:
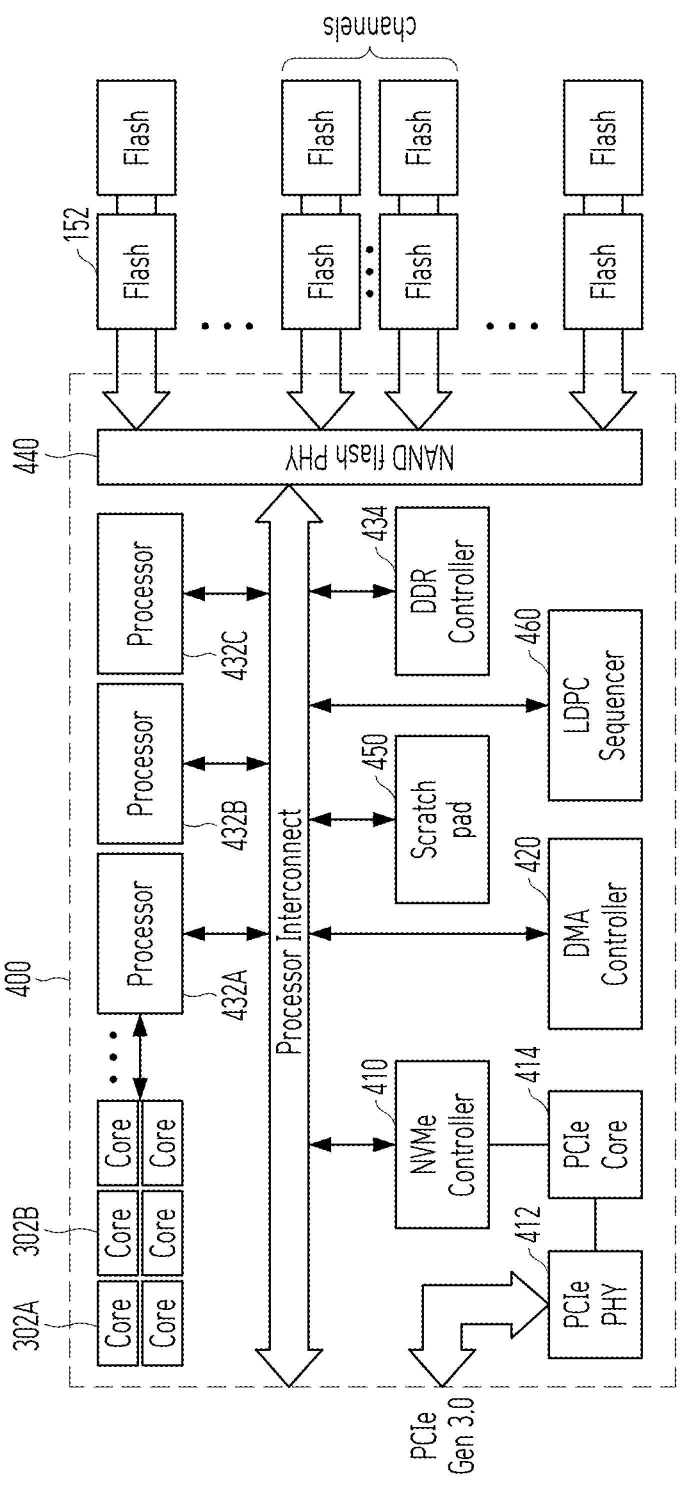
FIG. 11 illustrates a memory system according to an embodiment of the present disclosure.

FIG. 11 illustrates a memory system according to an embodiment of the present disclosure. FIG. 11 shows a memory system including multiple cores or multiple processors, which is an example of a data storage system. The memory system may support a Non-Volatile Memory Express protocol (NVMe).

The NVMe is a type of transfer protocol designed for a solid-state memory that can operate much faster than a conventional hard drive. The NVMe can support higher input/output operations per second (IOPS) and lower latency, resulting in faster data transfer speeds and improved overall performance of the data storage system. Unlike SATA, which has been designed for a hard drive, the NVMe can leverage the parallelism of solid-state storage to enable more efficient use of multiple queues and processors (e.g., CPUs). The NVMe is designed to allow hosts to use many threads to achieve higher bandwidth. The NVMe can allow the full level of parallelism offered by SSDs to be fully exploited. However, because of limited firmware scalability, limited computational power, and high hardware contention within SSDs, the memory system might not be able to process a large number of I/O requests in parallel.

Referring to FIG. 11, a host, which is an external device, can be coupled to the memory system through a plurality of PCIe Gen 3.0 lanes, a PCIe physical layer 412, and a PCIe core 414. A controller 400 may include three embedded processors 432A, 432B, 432C, each using a plurality of cores 302A, 302B. Herein, the plurality of cores 302A, 302B or the plurality of embedded processors 432A, 432B, 432C may have a pipeline structure.

The plurality of embedded processors 432A, 432B, 432C may be coupled to an internal DRAM controller (DDR controller) 434 through a processor interconnect. The controller 400 further includes a Low Density Parity-Check (LDPC) sequencer 460, a Direct Memory Access (DMA) engine 420, a scratch pad memory 450 for metadata management, and an NVMe controller 410. Components within the controller 400 may be coupled to a plurality of channels connected to a plurality of memory packages (Flash) 152 through a flash physical layer (NAND flash PHY) 440. The plurality of memory packages 152 may correspond to a plurality of memory chips in a memory die 222 described above with reference to FIG. 1.

According to an embodiment, the NVMe controller 410 included in the controller 400 is a type of storage controller designed for use with solid state drives (SSDs) that use an NVMe interface. The NVMe controller 410 may manage data transfer between the SSD and the computer CPU as well as other functions such as error correction, wear leveling, and power management. The NVMe controller 410 may use a simplified, low-overhead protocol to support fast data transfer rates.

According to an embodiment, a scratch pad memory 450 may be a storage area set by the NVMe controller 410 to temporarily store data. The scratch pad memory 450 may be used to store data waiting to be written to a plurality of memory packages 152. The scratch pad memory 450 can also be used as a buffer to speed up the writing process, typically with a small amount of Dynamic Random Access Memory (DRAM) or Static Random Access Memory (SRAM). When a write command is executed, data may first be written to the scratch pad memory 450 and then transferred to the plurality of memory packages 152 in larger blocks. The scratch pad memory 450 may be used as a temporary memory buffer to help optimize the write performance of the plurality of memory packages 152. The scratch pad memory 450 may serve as intermediate storage for data before the data is written to non-volatile memory cells.

The Direct Memory Access (DMA) engine 420 included in the controller 400 is a component that transfers data between the NVMe controller 410 and a host memory in the host system without involving a host's processor. The DMA engine 420 can support the NVMe controller 410 to directly read or write data from or to the host memory without intervention of the host's processor. According to an embodiment, the DMA engine 420 may achieve or support high-speed data transfer between a host and an NVMe device, using a DMA descriptor that includes information regarding data transfer such as a buffer address, a transfer length, and other control information.

The LDPC sequencer 460 in the controller 400 is a component that performs error correction on data stored in the plurality of memory packages 152. Herein, an LDPC code is a type of error correction code commonly used in a NAND flash memory to reduce a bit error rate. The LDPC sequencer 460 may be designed to immediately process encoding and decoding of LDPC codes when reading and writing data from and to the NAND flash memory. According to an embodiment, the LDPC sequencer 460 may divide data into a plurality of blocks, encode each block using an LDPC code, and store the encoded data in the plurality of memory packages 152. Thereafter, when reading the encoded data from the plurality of memory packages 152, the LDPC sequencer 460 can decode the encoded data based on the LDPC code and correct errors that may have occurred during a write or read operation. The LDPC sequencer 460 may correspond to an ECC circuitry included in the controllers 210 and 160 described in FIGS. 1 and 10, respectively.

The controllers 210, 160, and 400 described respectively in FIGS. 1, 10, and 11 can manage and control status information for multiple memory blocks or multiple super blocks in the memory devices 220, 180, and 152. For example, the controllers 210, 160, and 400 can check an operation status of the memory block or the super block and determine purposes for which the memory block or the super block can be used based on the operation status of the memory block or the super block.

Whenever a data input/output operation such as storing data in the memory block or the super block, reading stored data, or erasing stored data is performed, the controller (210, 160, or 400) can update a read count, a program/erase count, etc. showing an operation status of the memory block or the super block. This status information can be stored or managed together with map data or mapping information. The lifespan of the memory block or the super block can be estimated based on this status information. The controller (210, 160, or 400) can determine whether the memory block or super block can be used or allocated to store user data or system data. Through this procedure, the controller (210, 160, or 400) can increase efficiency of resources or operations in a view of using the memory block or super block within the memory device (220, 180, or 152).

As above described, a memory system according to an embodiment of the present disclosure can avoid using most regions within a reserved area, which can be used for various purposes, for replacing bad blocks, thereby reducing a size of the reserved area or improving efficiency of resource management for operations utilizing the reserved area.

Further, a memory system according to an embodiment of the present disclosure can improve a lifespan of a memory device by allocating or using an area of the memory device corresponding to a purpose based on calculating or estimating a lifespan of a unit in the memory device.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system comprising:

a memory device comprising a plurality of memory blocks constituting a plurality of super blocks in which data is stored according to allocation information of each of the plurality of super blocks; and a controller configured to perform a bad block management operation when a memory block included in a first super block from among the plurality of super blocks is determined to be a bad block, wherein the controller is configured to, for the bad block management operation, change allocation information of the first super block based on a lifespan information of the first super block.

2. The memory system according to claim 1, wherein the controller is configured to:

change the allocation information of the first super block to system data when the lifespan information of the first super block is equal to or longer than a reference lifespan of a memory block storing system data in the memory device; and change the allocation information of the first super block to user data when the lifespan information of the first super block is shorter than the reference lifespan.

3. The memory system according to claim 2, wherein the lifespan information of the first super block includes estimated End Of Life (EOL) information based on Total Bytes Written (TBW) or Drive Writes per day (DWPD).

4. The memory system according to claim 1, wherein the controller is configured to:

compare a first number of super blocks from among the plurality of super blocks whose allocation information is system data with a second number of super blocks from among the plurality of super blocks including the bad block; and determine the allocation information of the first super block based on a comparison result.

5. The memory system according to claim 4, wherein the controller is configured to determine the allocation information of the first super block as system data when the second number is equal to or greater than the first number.

6. The memory system according to claim 5, wherein the controller is configured to select an operable block for replacing the bad block from the plurality of memory blocks included in at least one super block whose allocation information is system data from among the plurality of super blocks.

7. The memory system according to claim 5, wherein the controller is configured to determine allocation information of consecutive super blocks, comprising the first super block and at least one super block adjacent to the first super block from among the plurality of super blocks as system data when the second number is less than the first number.

8. The memory system according to claim 1, wherein the controller is configured to select an operable block for replacing the bad block from the plurality of memory blocks included in at least one super block whose allocation information is system data when a first number of super blocks whose allocation information is system data is greater than a preset threshold and the allocation information of the first super block is user data.

9. The memory system according to claim 1, wherein the controller is configured to replace the bad block included in the first super block with an operable block from among the plurality of memory blocks in the memory device through the bad block management operation.

10. The memory system according to claim 1, wherein the memory device includes a second super block set as a reserve area, and wherein the controller is configured to determine allocation information of the second super block as user data after performing the bad block management operation for the first super block.

11. A memory system, comprising:

a memory device divided into a system data area and a user data area, each data area including a plurality of memory blocks constituting a plurality of super blocks; and a controller configured to set a first reconstructed super block by replacing a bad block with an operable block from among the plurality of memory blocks when at least one of memory blocks included in a first super block from among the plurality of super blocks is the bad block, wherein the controller is further configured to:

compare a first number of super blocks including at least one bad block with a second number of super blocks allocated to the system data area; and set the first reconstructed super block to the system data area or the user data area based on the comparison result.

12. The memory system according to claim 11, wherein the controller is configured to:

include the first reconstructed super block in the system data area if the first number is equal to or greater than the second number; and search for the operable block in the plurality of memory blocks in the system data area.

13. The memory system according to claim 12, wherein the controller is configured to include at least one super block adjacent and contiguous to the first reconstructed super block in the system data area when the first number is less than the second number.

14. The memory system according to claim 13, wherein the first reconstructed super block included in the system data area and a super block included in the user data area are physically separate from each other.

15. The memory system according to claim 11, wherein the controller is configured to set the first reconstructed super block to the system data area or the user data area, based on lifespan information of the operable block and the data area of the first super block including the bad block.

16. The memory system according to claim 15, wherein the controller is configured to:

include the first reconstructed super block in the system data area if the lifespan information of the operable block is equal to or greater than a reference lifespan of the system data area; and include the first reconstructed super block in the user data area if the lifespan information of the operable block is shorter than the reference lifespan.

17. The memory system according to claim 11, wherein the operable block is included in a super block in the system data area and the bad block is included in a second super block in the user data area.

18. The memory system according to claim 17, wherein the controller is configured to include the first reconstructed super block in the user data area when lifespan information of the first reconstructed super block is greater than a reference lifespan of the system data area.

19. A memory system, comprising:

a memory device divided into a system data area, a user data area, and a reserved area, each area including a plurality of memory blocks constituting a plurality of super blocks; and a controller for performing a bad block management operation when at least one of the plurality of memory blocks included in a first super block among the plurality of super blocks is determined to be a bad block, wherein the controller is configured to, through the bad block management operation, replace the bad block with an operable block from among the plurality of memory blocks included in at least one super block included in the system data area, and wherein the controller is configured to change an area to which the first super block is allocated based on lifespan information of the first super block and a reference lifespan of the system data area.

* * * * *